Feb. 24, 1959
B. E. AHLPORT
2,874,584
REVERSING MECHANISM
Filed Feb. 13, 1956
4 Sheets-Sheet 1
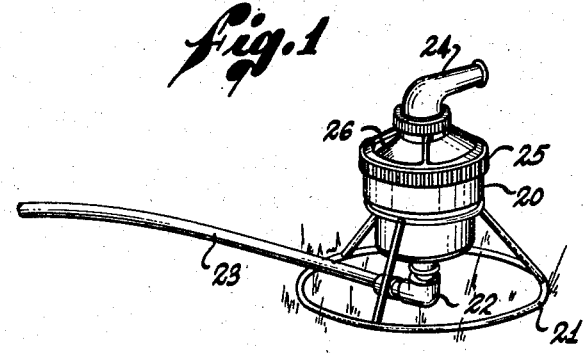
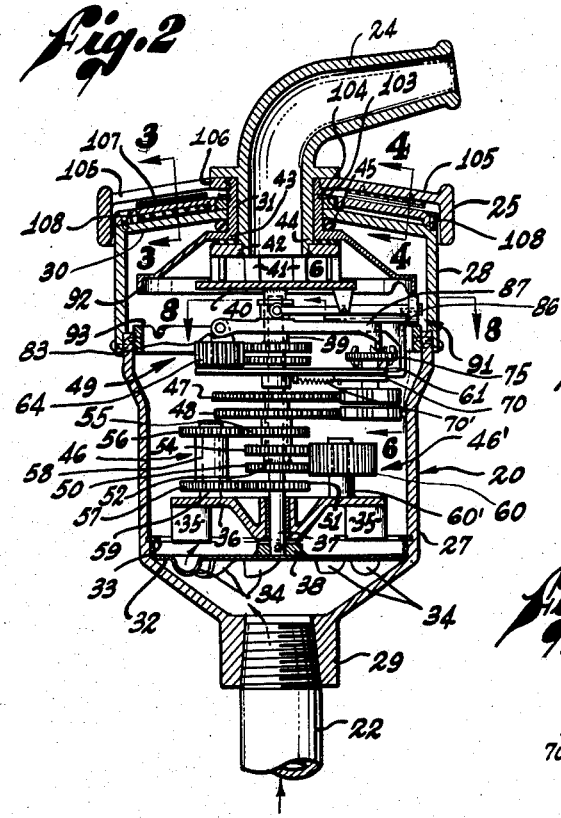
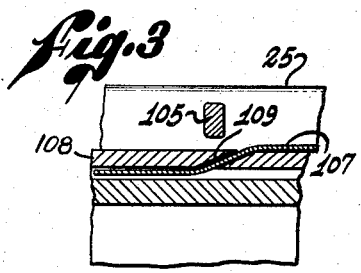
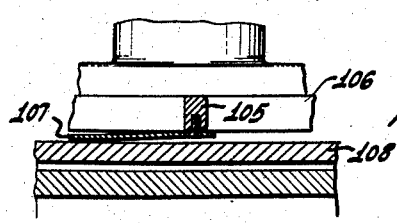
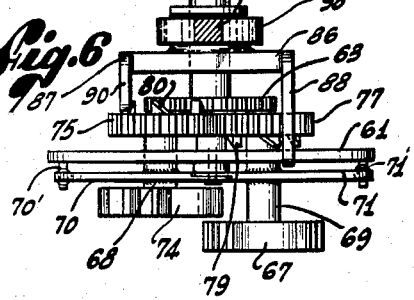
INVENTOR.
BRODIE E. AHLPORT
BY
ATTORNEY Feb. 24, 1959 B. E. AHLPORT 2,874,584
REVERSING MECHANISM
Filed Feb. 13, 1956 4 Sheets-Sheet 2
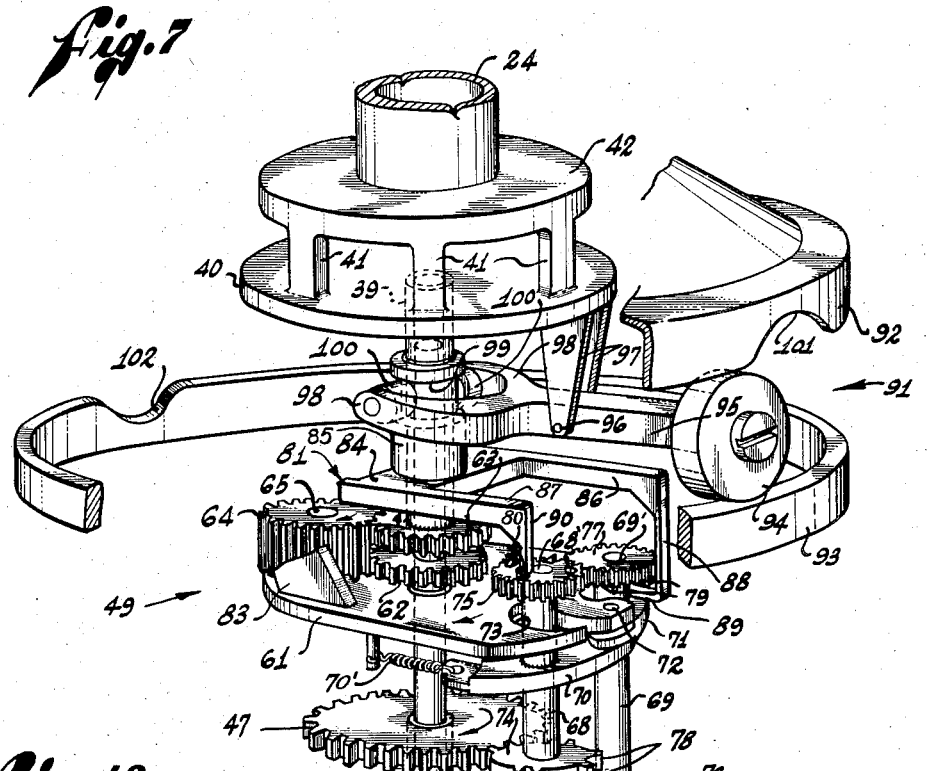
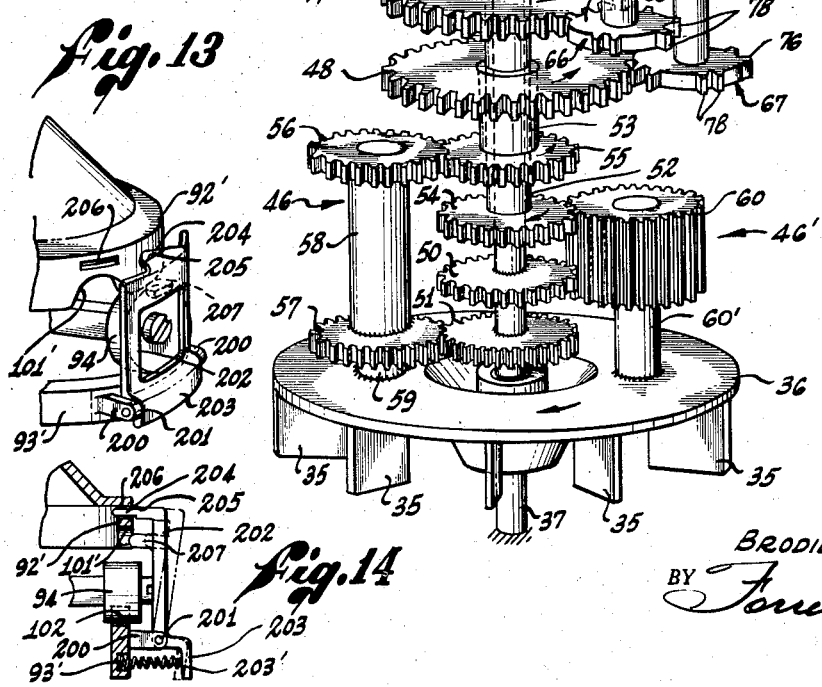
INVENTOR.
BRODIE E. AHLPORT
BY
ATTORNEY Feb. 24, 1959   B. E. AHLPORT   2,874,584
REVERSING MECHANISM
Filed Feb. 13, 1956   4 Sheets-Sheet 3
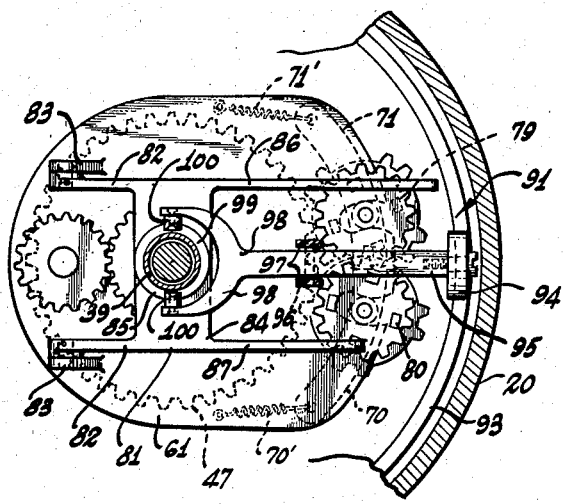
INVENTOR.
BRODIE E. AHLPORT
BY
ATTORNEY Feb. 24, 1959 B. E. AHLPORT 2,874,584
REVERSING MECHANISM
Filed Feb. 13, 1956 4 Sheets-Sheet 4
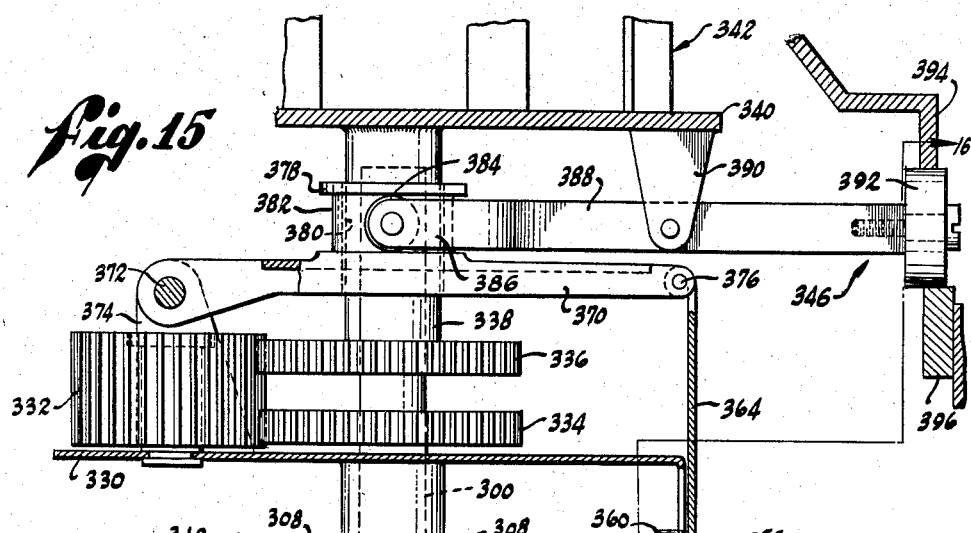
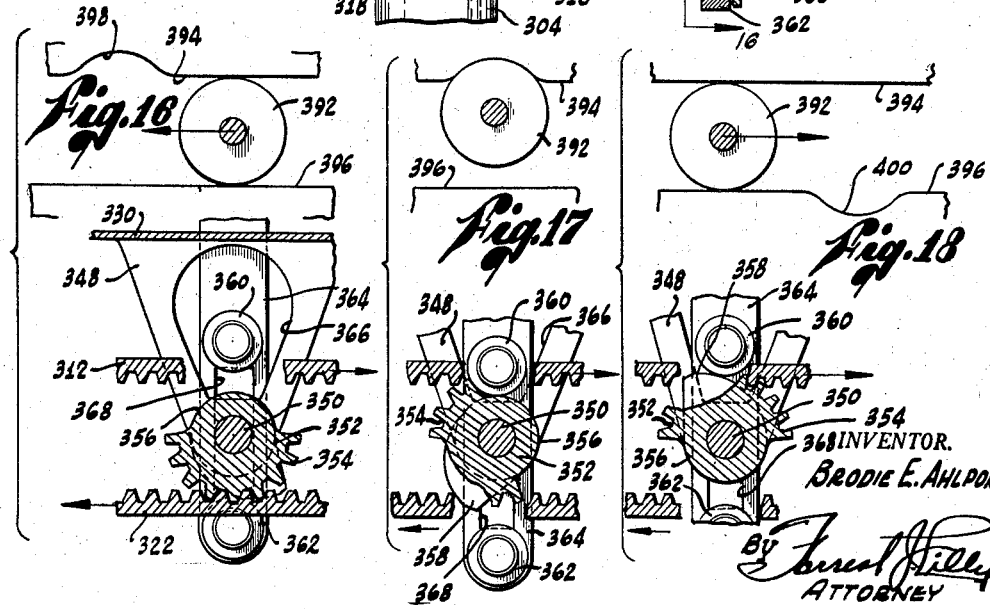
INVENTOR.
BRODIE E. AHLPORT
ATTORNEY 2,874,584
Patented Feb. 24, 1959

2,874,584
REVERSING MECHANISM
Brodie E. Ahlport, Los Angeles, Calif.

Application February 13, 1956, Serial No. 565,102

28 Claims. (Cl. 74—319)

This invention relates generally to rotation reversing mechanisms, and more particularly to gear mechanisms for reversing the direction of rotation of a follower while a driver continuously rotates in one direction.

Automatic reversing mechanisms employing trains of gearing are well known. Generally, during the reversing cycles of these automatic reversing mechanisms there is imposed on the driver a load substantially in excess of that inherently required to overcome the inertia and static friction of the parts whose direction of rotation is reversed.

Moreover, such prior reversing mechanisms often have "dead center points" in their reversing cycles wherein the driving forces are balanced or zero and through which points the parts are normally carried by the inertia of the mechanism.

These prior mechanisms have in their operating cycles, therefore, points at which the mechanism is subject to stalling. Also if the mechanism, when shut down, comes to rest in a point of increased load or in a dead center point, manual shifting of the parts of the mechanism away from such points is generally necessary before the mechanism can be restarted.

Reversing mechanisms in which the load on the driver is substantially increased during the reversing cycle are disadvantageous or even useless in many applications. They are unsuited, for example, to situations in which the available driving torque or power is relatively small, such that a slight increase in loading can stall the driver. Thus a reversing mechanism in which no increase in load, above that necessary to overcome the inertia and static friction of the mechanism, occurs during the reversing cycle and in which there are no dead center positions, would forestall any possibility of stalling even though the applied power be small.

In addition, it is desirable, in certain applications of reversing mechanisms, to have a large gear speed reduction. This reduction is particularly important when the available power is to be taken from a high speed rotating element with very much lower starting torque.

A primary object of the present invention is accordingly to provide a novel and improved rotation reversing mechanism characterized by its ability to perform its reversing function without even momentarily increasing the load on the driver above that necessary to overcome inertia and static friction, and one in which there is no "dead center" point or position throughout the reversing cycle.

A further object of the invention is to provide a train of gearing incorporating a self-actuating reversing mechanism which decreases the loading of the driver during a portion of the reversing cycle.

A further object of the invention is to provide a reversing mechanism which reverses the direction of rotation of a rotatably mounted follower at two points in its circular path, and in which means are provided for controlling or adjusting these reverse points to any predetermined positions, such that the follower may be made to oscillate throughout any predetermined length of arc up to substantially a full circle, with the end points of such arc located as desired.

An auxiliary object is to provide a reversing mechanism of the class described which has a large speed reduction between driver and follower and wherein the reversing operation is accomplished from an intermediate portion of the speed reduction gearing so as to minimize the time of reversal.

Still another object is to provide resilient mounting means for certain of the gears to prevent any possibility of jamming of the mechanism.

In a preferred and illustrative embodiment of the invention, there are provided a pair of counter rotating gears driven through intermediate epicyclic gear trains by an initial driver rotating continuously in one direction. The epicyclic gear trains afford a large gear speed reduction between the driver and counter rotating gears.

An escapement mechanism, rotatably supported in operative association with the counter rotating gears and drivably connected to the final follower, is provided with engagement means adapted to engage one or the other of the gears to cause rotation of the final follower in one direction or the other depending upon which one of the counter rotating gears is engaged. Pallet means embodied in the escapement mechanism maintain the engagement means in engagement with one or the other of the counter rotating gears during normal operation. During reversing cycles, the pallet means are controlled to permit the release of the engaged one of the engagement means from its respective counter rotating gear and to subsequently lock the other engagement means to the other counter rotating gear so as to effect reversed direction of rotation of the follower.

At no point in the reversing cycle does the load on the driver increase about that value necessary to overcome the inertia and static friction inherently involved in reversing the direction of movement of the parts, and, in fact, during a portion of the reversing cycle the load on the driver is actually decreased below the value of the load necessary to drive the mechanism in normal operation. Accordingly, there is no possibility of the mechanism stalling or passing through any "dead center" position during the reversing cycle.

Control of the points at which the reversing cycles occur is effected through a cam control assembly including a pair of stationary, relatively adjustable control cams operably engaged by a cam control arm. The pallet means are controlled, through this intermediate control arm, by the cams in a manner to reverse the engagement of the engagement means with the counter rotating gears, and hence effect the reversing cycles, at predetermined points of the circle described by the follower.

Jamming of the mechanism is avoided by resiliently mounting the engagement means to bias the same into engagement with their respective counter rotating gears so as to permit retraction thereof in the event of clashing.

A better understanding of the invention will be had by referring to the following detailed description and the accompanying drawings wherein:

Fig. 1 is a perspective view illustrating one exemplary application of the present reversing mechanism;

Fig. 2 is an enlarged section taken longitudinally through the device of Fig. 1;

Fig. 3 is an enlarged section taken along line 3—3 of Fig. 2;

Fig. 4 is an enlarged section taken along line 4—4 of Fig. 2;

Fig. 5 is a perspective view of an annular strip embodied in the device of Fig. 1 for indicating the sector of oscillatory movement of the follower;

Fig. 6 is an enlarged section taken along line 6—6 of Fig. 2;

Fig. 7 is an enlarged and axially expanded perspective view of the reversing mechanism of this invention;

Fig. 8 is an enlarged section taken along line 8—8 of Fig. 2 and illustrating the escapement mechanism of the invention;

Fig. 9 is a fragmentary showing of the counter rotating gears and engagement means embodied in the escapement mechanism of Fig. 8, the parts being shown as engaged for one direction of rotation of the follower;

Fig. 10 is a view similar to Fig. 9 but with the parts shown as engaged for the opposite direction of rotation of the follower;

Fig. 11 is a side elevation of the parts of Fig. 9;

Fig. 12 is a view taken on line 12—12 of Fig. 10;

Fig. 13 is a perspective view illustrating a modified form of the invention;

Fig. 14 is a section taken through Fig. 13;

Fig. 15 is an enlarged partial elevational view, partly in section, of a still further modified form of the invention;

Fig. 16 is a section taken along line 16—16 of Fig. 15; and

Figs. 17 and 18 are views similar to Fig. 16 but with certain parts shown in different operative positions.

The reversing mechanism of this invention finds usefulness in numerous applications, but for facility of presentation, the invention will be described with particular reference to one of these applications, namely, a lawn sprinkler, but without limitation thereto.

One form of lawn sprinkler incorporating the reversing mechanism of the invention is illustrated in Fig. 1 and comprises a stationary, water tight casing 20 which, as will be seen, houses the present reversing mechanism. Casing 20 is vertically supported on a stand 21 for resting on the ground.

Fixed in the lower end of the casing is a hose coupling 22 to which may be connected a garden hose 23, leading to a supply, not shown, of water under pressure. Mounted in the upper end of the casing for rotary movement about a vertical axis is a nozzle 24, hereinafter referred to as a "follower" which, upon water being supplied to the sprinkler through hose 23, is oscillated through a predetermined horizontal arc through the operation of the present reversing mechanism. The length of this arc, as will presently be seen, may be varied by adjustment of a ring member 25 whose peripheral surface is serrated, as shown, to facilitate turning thereof. The length and relative position of the arc is indicated by means generally shown at 26.

Referring next to Fig. 2, casing 20 is hollow and generally cylindrical and is comprised of two substantially cup-shaped members 27 and 28 secured together at their rims to form a water tight container. Lower cup member 27 has a lower axial, threaded boss 29 for receiving coupling 22. The upper end wall 30 of the casing is centrally bored to rotatably receive a sleeve bearing 31 in which nozzle 24 is journaled, as will be hereinafter more fully described.

Referring to the lower portion of Fig. 2, a deflector plate 32 is secured against axial movement in the lower end of cup member 27, with a peripheral flange thereof in engagement with the internal surface of the cup member 27, by a snap ring 33. Deflector plate 32 is formed with a plurality of circumferentially arranged deflector scoops 34 for directing water, entering through coupling 22, against a plurality of vanes 35 carried on an impeller 36, hereinafter referred to as a "driver."

Driver 36 is rotatable on a central vertical shaft 37, fixed at its lower end in a hub 38 secured to plate 32. Shaft 37 is journaled at its upper end in a sleeve 39 depending from a disk 40 fixed, by circumferentially spaced ribs 41 and an annular flange 42, to nozzle or follower 24.

Sleeve bearing 31 has a radial flange 43 between which and flange 42 is positioned a gasket 44 provided a rotary seal between the nozzle 24 and sleeve 31. An O-ring 45 encircles sleeve 31 between its flange 43 and casing end wall 30 to seal the sleeve to the casing 20.

Driver 36 operates through two epicyclic reduction gear trains, generally indicated at 46 and 46', a pair of counter rotatable gears 47 and 48, and an escapement mechanism, generally indicated at 49 to oscillate follower 24 through a predetermined arc, which may, as previously indicated, be varied by angular adjustment of ring member 25. Driver 36 is, during operation of the sprinkler constituting the illustrative embodiment of the invention, continuously rotated in one direction by the water entering through coupling 22 and directed into impingement with vanes 35 by scoops 34, the water flowing through the casing 20, between ribs 41, and emerging as a stream from the nozzle 24.

The reversing mechanism briefly outlined above will now be described in greater detail by reference to Figs. 6–12.

As just indicated, driver 36 operates through two epicyclic reduction gear trains 46 and 46' to impart counter rotation to two concentric gears 47 and 48 which are rotatable independently about the fixed shaft 37. To this end, there are rigidly secured on shaft 37, just above driver 36, two axially spaced sun gears 50 and 51. Rigidly mounted on the lower end of a sleeve 52, fixed at its upper end to gear 47 and rotatable on shaft 37, is a sun gear 54. Fixed at its upper end to gear 48 is a sleeve 53 which is rotatable on sleeve 52 and rigidly mounts a sun gear 55 at its lower end. Epicyclic gear train 46 is completed by planet gears 56 and 57 on a gear sleeve 58 rotatably mounted on a planet gear shaft 59 extending vertically from driver 36, gear 56 meshing with gear 55, and gear 57 meshing with sun gear 51. The other epicyclic gear train 46' is completed by a planet gear 60 rotatably mounted on a plant gear shaft 60' extending vertically from driver 36, gear 60 meshing with sun gear 50 and gear 54.

The design of epicyclic gear trains to cause a driven gear to have either the same or a reversed sense of rotation is well understood. The purpose here is to counter rotate gears 47 and 48 from unidirectional driver 36. In the present illustrative example, this has been accomplished by employing the same number of teeth on rotatable sun gears 54 and 55 as on planet gears 56, 57 and 60, and by giving fixed sun gear 51 one more tooth than that number, and sun gear 50 one less tooth than that number.

In result, rotation of driver 36 in the direction indicated by the arrow will cause shafts 58 and 60', and thus planet gears 56, 57 and 60, to revolve or planetate around the center shaft 37. The planet gears 56, 57 and 60 will also rotate on their own axes as they are carried bodily around by the driver 36 due to the meshing of planet gears 57 and 60 with the fixed sun gears 51 and 50, respectively. Their respective directions of rotation are indicated by the arrows. Sun gears 54 and 55 are free to rotate independently of each other with respect to the center shaft 37. Since sun gear 50 has fewer teeth than sun gear 51 and the other gears, planet gear 60 will make fewer revolutions on its own axis over a period of one bodily revolution about shaft 37 than will planet gears 56 and 57. These latter two gears are rotated by fixed sun gear 51 which has a greater number of teeth than the other gears. Accordingly, driven sun gear 54 will be caused to rotate or advance in one direction, as indicated by the arrow, while driven sun gear 55 will be caused to rotate in a counter direction, or lag, as indicated by the arrow. It will further be noted that there has been effected by this epicyclic arrangement a large gear reduction between the driver 36 and the counter rotating sun gears 54 and 55. In the example here given, the counter rotating sun gears 54 and 55 will be driven in opposite directions at the same speed. Broadly speaking, this is not essential, and for some purposes it even may be desirable to drive the gears at differing speeds. This can readily be accomplished by adjustment of the number of teeth of the gears within the two epicyclic gear trains, as will readily be apparent to those skilled in the art.

The gear sleeve 52 carrying and driven by the sun gear 54 mounts at its upper end counter rotatable gear 47, and the gear sleeve 53 carrying and driven by sun gear 55, mounts at its upper end the other counter rotatable gear 48. Counter rotating gears 47 and 48 will thus rotate with the sun gears 54 and 55, respectively, in opposite directions, as indicated by the arrows. As mentioned previously, the mechanism shown in Fig. 7 has been axially expanded for purposes of clarity; the actual mechanism, it is to be understood, may be much more compact. Further, suitable positioning collars and/or thrust bearings will be understood as being provided for proper axial positioning of the sleeves on the shaft 37, these having been omitted from the drawings for clarity of illustration.

As shown in Figs. 2 and 7, a platform 61 is arranged for rotation on the center shaft 37, suitable thrust and radial bearings, not shown, being provided. This platform supports the previously mentioned and presently described escapement mechanism 49 embodying engagement means adapted to mesh with one or the other of the counter rotating gears 47 or 48 to cause the platform 61 to revolve about the shaft 37 in one direction or the other.

Platform 61 drives follower 24 in one direction of rotation or the other, depending on the direction of rotation in which the platform is driven, through a third epicyclic gear train consisting of a fixed sun gear 62 rigid on shaft 37 above platform 61 and a rotatable sun gear 63, rigid on the lower end of sleeve 39 fixed to the follower. These sun gears have an unequal number of teeth and mesh with a planet gear 64 rotatable on a planet gear shaft 65 carried on platform 61.

When platform 61 rotates on shaft 37, in the direction of the arrow, planet gear 64 will planetate about the sun gears 62 and 63; the latter having a lesser number of teeth than the former. The rotation imparted to the planet gear 64 in the direction indicated, during this revolving of its shaft 65 around shaft 37, will impart rotation to sun gear 63, in the direction of the arrow, due to the unequal number of teeth on the sun gears. This action is precisely the same as that previously described with reference to epicycle gear trains 46 and 46' and results in rotation of follower 24, in a direction opposite to that of the platform and at speed which is less than the speed of rotation of the platform by the ratio of the gear train.

It will be apparent, however, that this third gear reduction could, if desired, be omitted and follower 24 directly driven from the platform 61.

The aforementioned escapement mechanism 49 for coupling platform 61 to one or the other of the counter rotating gears 47 and 48 comprises a pair of engagement means 66 and 67 alternately engageable with the gears 47 and 48. These engagement means comprise a pair of sleeves 68 and 69 rigidly carried by a pair of arms 70 and 71 pivoted, about a common axis 72, to the under side of platform 61. Platform 61 is arcuately slotted at 73 to accommodate pivotal movement of the sleeves 68 and 69 about the axis 72.

Sleeve 68 rotatably receives a shaft 68' rigidly mounting at its lower end, in the plane of counter rotating gear 47, a first sector gear 74, and at its upper end a spur gear 75. Sleeve 69 similarly rotatably receives a shaft 69' rigidly mounting at its lower end, in the plane of counter rotating gear 48, a second sector gear 76, and at its upper end a spur gear 77 which is identical to and meshes with spur gear 75.

As illustrated sector gears 74 and 76 each have four, circumferentially spaced pairs of teeth 78 adapted to mesh with the teeth on their associated counter rotating gears 47 and 48. The two spur gears 75 and 77 are in constant mesh, while the two sector gears 74 and 76 are so relatively oriented that when the teeth 78 of one of the sector gears, say gear 74, are in mesh with the teeth on its respective counter rotating gear 47, the teeth 78 on the other sector gear 76 will be out of mesh with or disengaged from the teeth of the other counter rotating gear 48 (see Fig. 9).

When shaft 68' is rotated on its own axis to disengage the teeth of its sector gear 74 from those of the counter rotating gear 47, rotation will be imparted to the sector gear 76 through spur gears 75 and 77 to bring the teeth 78 of sector gear 76 into mesh with the teeth on counter rotating gear 48 (see Fig. 10).

Thus only one or the other of the counter rotating gears can be meshed or engaged with sector gears 74 and 76 at one time. Springs 70' and 71', connected between the platform 61 and arms 70 and 71, respectively, serve to resiliently bias the sector gears, carried on the latter, toward the counter rotating gears so as to permit outward movement of the arms and sector gears in the event of improper engagement of the latter with the counter rotating gears, as will be seen.

Reviewing the structure described thus far, it will be seen that the two gears 47 and 48, at the center of the drawing, rotate continuously in counter directions, and with considerably reduced speed as compared with the speed of the primary driver 36. Adjacent the counter rotating gears are the two intercoupled sector gears 74 and 76 mounted on platform 61 which is, in turn, mounted for free rotation in either direction about the center shaft 37. When one of the counter rotating gears is engaged by one of the sector gears, the other sector gear is out of mesh with the other counter rotating gear, and vice-versa.

Now, if one of the sector gears 74 or 76 be engaged with its respective counter rotating gear, and if means are provided for preventing such sector gear from rotating on its own axis, the engaged sector gear will necessarily remain locked to its respective counter rotating gear and will be bodily rotated with the latter about the shaft 37. Thus, the whole platform 61 together with the parts carried thereby will be rotated as a unit on center shaft 37 by the counter rotating gear which is then engaged by its sector gear. This motion is transmitted to the final follower 24 through the planet gear 64 and sun gears 62 and 63.

If now the sector gear in engagement with the counter rotating gear be released to rotate on its own axis, it will "escape" or rotate out of engagement with its counter rotating gear due to the latter's rotation and the greater resistance to rotation of the platform than that of the shaft 68' or 69', carrying the engaged one of the sector gears, in its associated sleeve 68 or 69. The rotation of this sector gear will be communicated to the other sector gear through the spur gears 75 and 77 to rotate said other sector gear into mesh with the other counter rotating gear. If means be provided for now preventing further rotation of this other sector gear on its own axis, it will remain locked to its corresponding counter rotating gear, and the platform and parts carried thereby will be carried around shaft 37 in the opposite direction. The rotation of the final follower will thus be reversed.

In order to prevent rotation of the sector gears 74 and 76 on their axes so that they may be locked to their respective counter rotating gears at the proper time, as described above, there are formed on the upper face of spur gear 75, to which sector gear 74 is rigidly connected by shaft 68', and the lower face of spur gear 77, to which sector gear 76 is rigidly connected by shaft 69', a plurality of equally circumferentially spaced projecting escapement teeth 79 and 80, respectively, equal in number to the number of sectors, or pairs of teeth 78 (shown as being four), carried by each sector gear.

As shown more clearly in Figs. 6 and 11, these escapement teeth 79 and 80 each have an inclined camming surface, designated as 79′ and 80′, respectively. These camming surfaces face in the directions in which their respective spur gears are intermittently rotated, during operation of the mechanism.

Operatively associated with the escapement teeth 79 and 80 is a pallet 81 having arms 82 pivoted at their ends between a pair of brackets 83 upstanding from platform 61 so that the pallet is mounted for vertical pivotal movement on the platform. A central portion 84 of the pallet has an upstanding sleeve 85 which is loosely received on sleeve 39, carried by the final follower 24, the loose engagement of the sleeve 85 on the sleeve 39 accommodating said vertical pivotal movement of the pallet.

Extending from central portion 84 of the pallet in an opposite direction to arms 82, are a second pair of arms 86 and 87. Arm 86 has a depending portion 88 at its free end which, in turn, is formed at its free end with a pallet finger 89 projecting beneath the lower face of spur gear 77. Arm 87 has a depending pallet finger 90 whose free end overlies the upper face of spur gear 75. The fingers 89 and 90 are so positioned that one or the other of said fingers may be engaged with one of its respective escapement teeth 79 or 80, as will be presently more fully described, to prevent rotation of the sector gears 74 and 76 about their own axes. The spacing between the free end of finger 90 and the upper surface of finger 89 is such that when the pallet 81 is in its central pivotal position of Fig. 7, the fingers are both disposed in the paths of their respective escapement teeth, while finger 90 may be raised out of the path of its escapement teeth 80 by upward pivotal movement of the pallet on the brackets 83, as shown in Fig. 12, and finger 89 may be lowered out of the path of its escapement teeth 79 by downward pivotal movement of the pallet on the brackets 83, as shown in Fig. 11. The pallet is preferably statically balanced to minimize inertial effects during its pivotal movement.

The angular spacing of the escapement teeth 79 and 80 is the same as the angular spacing of the pairs of teeth 78 on the sector gears 74 and 76, and the positioning of the escapement teeth on the spur gears 75 and 77 is such that when the pallet 81 is in its intermediate pivotal position, shown in Fig. 7, pallet finger 90 will be engaged with one of the escapement teeth 80 on spur gear 75 whenever the corresponding sector gear 74 is engaged with its counter rotating gear 47. Similarly finger pallet 89 will be engaged with one of the escapement teeth 79 on spur gear 77 whenever the corresponding sector gear 76 is engaged with its counter rotating gear 48.

It will be apparent, in the light of the foregoing description, that one or the other of the sector gears 74 or 76 may be locked to its corresponding counter rotating gear, by engagement of one or the other of the fingers 89 or 90 with one of its respective escapement teeth, to cause rotation of platform 61 in one direction or the other depending on which counter rotating gear is engaged. Moreover, it will be seen that if pallet 81 is pivoted, either upwardly or downwardly, as the case may be, on the brackets 83 to disengage said engaged one of the fingers 89 or 90 from its respective escapement tooth, the corresponding sector gear will, in the aforedescribed manner, be rotated out of engagement with the associated counter rotating gear. The other sector gear will be simultaneously rotated, through the spur gears 75 and 77, into engagement with the other counter rotating gear and one of the escapement teeth on the spur gear connected to said other sector gear will be rotated into engagement with the other one of the fingers 89 or 90. This latter sector gear will thus be locked to its counter rotating gear and platform 61 will be driven in a reverse direction of rotation. Subsequent pivoting of pallet 81 to release this latter engaged sector gear will result in relocking of the first sector gear to its counter rotating gear to repeat the reversing cycle. Thus alternate upward and downward pivoting of the pallet 81 from its central position of Fig. 7, results in rotation of the platform 61, and follower 24 first in one direction and then in the other.

Pivoting of the pallet 81 to disengage the fingers 89 and 90 from the escapement teeth is accomplished by the camming action between the fingers and the inclined camming surfaces 79′ and 80′ on the escapement teeth which action tends to pivot the pallet upwardly when finger 90 is engaged with one of the teeth 80 on spur gear 75 and to pivot the pallet downwardly when finger 89 is engaged with one of the teeth 79 on spur gear 77. It is clear, therefore, that if means were not provided to retain the pallet in its central pivotal position, wherein the fingers are positioned in the paths of the escapement teeth, until the follower 24 has been rotated through a desired arc, the pallet would merely be oscillated about its pivot by the alternate camming actions between the escapement teeth 79 and 80 and fingers 89 and 90, the platform 61 and follower 24 remaining stationary.

Retention of the pallet in its central pivotal position until the follower 24 has been rotated to a desired point of reversal is accomplished through a cam control assembly generally indicated at 91.

This control assembly comprises a pair of axially spaced, cylindrical cams 92 and 93 between the opposing cam surfaces of which rides a roller 94 carried on one end of a cam control arm 95. Arm 95 is pivoted, intermediate its ends at 96, between a pair of brackets 97 depending from disk 40 carried by follower 24. The other end of arm 95 forms a yoke between the arms 98 of which passes sleeve 85 of the pallet 81. This sleeve 85 has a circumferential groove 99 adjacent one end and which slidably receives the ends of a pair of coaxial pins 100 carried on yoke arms 98.

It will be seen that control arm 95 will be carried around with final follower 24, as the latter is rotated, roller 94 moving between the cams 92 and 93. Further, pivotal movement of arm 95 on brackets 97 will normally be prevented due to the limiting action of cams 92 and 93. Accordingly, pivotal movement of pallet 81 on its brackets 83 will normally be prevented owing to the engagement of pins 100, on the arm 95, in groove 99.

The arrangement is such that when the parts are positioned, as shown in Fig. 7, pallet 81 will be retained in its aforementioned intermediate pivotal position wherein the pallet fingers 89 and 90 are disposed in the paths of their associated escapement teeth 79 and 80. One or the other of the sector gears 74 or 76 will, therefore, be locked to its respective counter rotating gear 47 or 48 and platform 61, final follower 24, and cam control assembly 91 will be rotated in directions determined by which of the counter rotating gears is engaged.

In order that the reversing cycles may be effected, cam 92 is recessed at 101 and cam 93 is recessed at 102. Recess 101, in cam 92, accommodates limited upward pivotal movement of cam control arm 95 and corresponding downward pivotal movement of pallet 81 to the aforedescribed position wherein finger 89 is disposed below the path of escapement teeth 79 on spur gear 77. Similarly recess 102, in cam 93, accommodates limited downward pivotal movement of cam control arm 95 and corresponding upward pivotal movement of pallet 81 to the aforedescribed position wherein finger 90 is disposed above the path of escapement teeth 80 on spur gear 75.

The above described pivotal movements of the pallet 81 and cam follower arm 95, to permit escape of the escapement teeth from their respective fingers, when cam roller 94 is alined with one or the other of the recesses 101 or 102, are effected by the inclined camming surfaces 79' and 80', on escapement teeth 79 and 80, against which the fingers 89 and 90 bear in the engaged positions of the escapement teeth and fingers. When finger 89 is engaged with one of the escapement teeth 79 on spur gear 77, the finger will tend to be cammed downwardly, out of engagement with the tooth, by the camming surface 79' thereof. Disengagement of the finger 89 from the tooth will, however, be prevented unless cam roller 94 is in a position of alinement with recess 101 in cam 92.

Similarly, when finger 90 is engaged with one of the escapement teeth 80 on spur gear 75, the finger will tend to be cammed upwardly, out of engagement with the tooth by the camming surface 80' thereof. Disengagement of the finger 90 from the tooth will, however, be prevented unless the cam roller 94 is in a position of alinement with recess 102 in cam 93. Thus, the relative positions of the recesses 101 and 102 in cams 92 and 93 will determine the arc of oscillation of the final follower 24.

As previously indicated, cam 92 is adjustable relative to the cam 93 to vary the length of the arc through which the final follower is oscillated. To this end, bearing sleeve 31 carries the upper cam 92 and is rotatably mounted in the upper end 30 of the casing 20, sleeve 31 being retained against downward movement into the casing by a washer 103 encircling the sleeve above end 30 and backed up by a snap ring 104.

Serrated ring 25 has formed thereon a plurality of radially extending, circumferentially spaced ribs 105 which merge at their inner ends with an annular hub 106 which is tightly threaded on the upper end of sleeve 31 so that sleeve 31 and, hence cam 92, may be rotated relative to the casing 20 by manipulation of ring 25, to vary the position of recess 101, in cam 92, relative to recess 102 in cam 93.

Indication of the relative positioning of cams 92 and 93 is afforded the means 26 including an annular strip 107 encircling sleeve 31 between the radial ribs 105 and an annular member 108 fixed to the upper end 30 of casing 20. Annular member 108 is downwardly flanged at its inner and outer peripheral edges to form between said flanges an annular web portion which is spaced from end 30 of the casing 20 as shown.

This web of the annular member is radially slotted at 109, as shown in Fig. 3, and one end of the annular strip 107 is threaded through this slot into the annular space between member 108 and the end 30 of casing 20.

Slot 109 in the member 108 is alined with recess 102 in cam 93 while the other end of the strip 107 is fixed to one of the ribs 105 in alinement with recess 101 in cam 92, the arrangement being such that the exposed portion of the strip 107 will be indicative of the angular displacement between the recesses 101 and 102 and hence of the arc through which the final follower 24 will oscillate.

Operation of the present reversing mechanism will be apparent from the foregoing description. Water entering through the lower end of the casing 20 will be directed, by scoops 34, against impeller vanes 35 of driver 36 to impart rotation to the latter in the direction indicated by the arrow in Fig. 7.

Driver 36 will rotate gears 47 and 48 in counter directions at reduced speeds through the epicyclic gear trains 46 and 46'. Assuming the parts to be positioned as shown in Fig. 7, wherein sector gear 74 is engaged with its counter rotating gear 47, the torque transmitted from counter rotating gear 47 to sector gear 74 will tend to rotate the latter and spur gear 75 about their own axis. This rotation of gears 74 and 75 will, however, be restrained by engagement of pallet finger 90 with one of the escapement teeth 80 on the gear 75. The camming action between the finger 90 and the inclined camming surface 80' on the engaged escapement tooth will produce on the pallet 81 a movement tending to pivot the pallet upwardly to disengage the finger from the tooth. However, owing to the connection of the cam control assembly 91 to the pallet, upward pivoting of the latter is prevented due to bearing of cam roller 94 against cam 93. Sector gear 74 is, therefore, locked in engagement with counter rotating gear 47 and platform 61 will be rotated in a clockwise direction in unison with said gear 47. Final follower 24 will be driven from the platform in a counter clockwise direction of rotation and at a reduced speed through the epicyclic gear train 62, 63, 64. Cam control arm 95, and roller 94 thereon, will be carried around in a counter clockwise direction with the final follower by virtue of the connection of the arm to the brackets 97 supported on the final follower.

Platform 61 and final follower 24 will continue to be driven from the counter rotating gear 47 until roller 94 has been carried around by the final follower 24 to a position of alinement with recess 102 in cam 93. This recess accommodates pivoting of cam control arm 95 and pallet 61, under the action of the aforementioned camming action, to disengage pallet finger 90 from escapement teeth 80 on spur gear 75.

Sector gear 74 will now be rotated, in the direction indicated in Fig. 10, by counter rotating gear 47, and sector gear 76 will be rotated in the opposite direction, through the spur gears 75 and 77, to disengage sector gear 74 from gear 47 and engage sector gear 76 with gear 48. During this rotation of the sector gears about their own axes, platform 61 and final follower 24 will remain stationary.

Rotation of sector gear 76 into engagement with counter rotating gear 48 brings one of the escapement teeth 79 on spur gear 77, rigid with sector gear 76, into engagement with pallet finger 89. The camming action between the inclined camming surface 79' of the engaged escapement tooth 79 and pallet finger 89 imparts downward pivotal movement to the pallet 61 and pivotal movement of cam control arm 95 in a direction to move roller 94 out of recess 102 and into engagement with cam 92. This engagement of roller 94 with cam 92 prevents camming of pallet finger 89 out of engagement with the engaged escapement tooth 79 so that sector gear 76 will be locked in engagement with its counter rotating gear 48 and platform 61 will, therefore, be carried around in a reverse, or counter clockwise, direction of rotation by said gear 48. Final follower 24 will be rotated in a reverse, or clockwise, direction of rotation through the epicyclic gear train 62, 63, 64.

Platform 61 and the final follower 24 will continue to be rotated in these directions from counter rotating gear 48 until cam control roller 94 has been carried around by the follower 24 to a position of alinement with recess 101 in cam 92. Recess 101 accommodates upward pivoting of the cam control arm 95 and downward pivoting of pallet 61, under the aforementioned camming action between pallet finger 89 and the engaged escapement tooth 79, to effect disengagement of the finger 89 from the tooth.

Sector gear 76 will now be rotated by gear 48, and sector gear 74 will be rotated through spur gears 75 and 77, to move sector gear 76 out of engagement with gear 48 and sector gear 74 into engagement with gear 47; the directions of rotation of the sector gears during the reversing cycles being always the same. Rotation of sector gear 74 about its own axis into engagement with gear 47 brings the next following escapement tooth 80, on spur gear 75, into engagement with pallet finger 90. The camming action between the inclined camming surface 80' on the engaged escapement tooth and finger 90 causing upward pivoting of the pallet 61 and corresponding downward pivoting of cam control arm 95 to move roller 94 out of recess 101 and into engagement with cam 93.

Sector gear 74 will, thus, be again locked to its counter rotating gear 47 and the directions of rotation of the platform 61 and final follower 24 will be reversed. It will be apparent, therefore, that the final follower 24 will oscillate through an arc whose length is determined by the relative angular displacement of recesses 101 and 102 in cams 92 and 93. As previously indicated this angular displacement, and hence the length of the arc through which the final follower oscillates, may be varied by rotating ring 25 relative to the casing 20, the exposed portion of annular strip 107 indicating the length and orientation of this arc. It will be seen that the reversing operations are accomplished from an intermediate portion of the speed reduction gearing, namely gears 47 and 48 and this in combination with the relatively small size of the sector gears 74 and 76 relative to the gears 47 and 48 acts to minimize the time of the reversing cycles.

If the sector gears and counter rotating gears are precision machined and the apparatus maintained in proper condition, there should ordinarily be no possibility of the sector gears clashing with the counter rotating gears as the former are rotated into engagement with the latter, as described above. It is possible, however, that after much wearing of the various parts, or where stamped rather than machined gears are employed, a sector gear may not fall into direct mesh with its counter rotating gear. To prevent jamming of the mechanism in such event, it is preferable to resiliently mount the sector gears with respect to the counter rotating gears.

To this end, the shafts 68' and 69', carrying the sector gears, have been journaled on the arms 70 and 71, respectively, which are pivoted at 72 to the platform 61. The springs 70' and 71' serve to resiliently bias the sector gears into engagement with the counter rotating gears, the arrangement being such that if these gears should clash, the sector gears may move away from the counter rotating gears, against the action of springs 70' and 71', to permit slipping of the teeth of the latter gears past those of the former until a condition of mesh is attained.

It will be seen that the pallet fingers 89 and 90, when engaged with the escapement teeth 79 and 80, to lock the sector gears to their counter rotating gears, form stops which retain the sector gears against disengagement from the counter rotating gears under the forces tending to separate these gears by swinging arms 70 and 71 outwardly about their pivot 72 during operation of the mechanism.

It will be noted that during the reversing cycles of the present reversing mechanism, the load on the driver 36 is never increased above that value necessary to overcome the inertia and static friction of the parts whose direction of rotation is reversed, namely, the platform 61 and elements carried thereon, the final follower 24, and the cam control arm 95. Moreover, this maximum load imposed on the driver during the reversing cycles will be less than that required to initially start the device from a condition of rest, owing to the inertia and static friction of the additional parts, namely the gear trains 46 and 46' and the counter rotating gears 47 and 48, which must be brought up to operating speed when the device is started. Thus, there are no points in the operating cycles of the mechanism, including its reversing cycles, whereat the load on the driver is so substantially increased as to render mechanism prone to stalling or impossible to start.

In fact, during the initial portion of the reversing cycles, the platform 61, final follower 24, and cam control arm 95, are disconnected from the driver by unlocking of the sector gears from their counter rotating gears to permit free rotation of the sector gears about their own axes, and the load on the driver is substantially diminished.

It will also be noted that no "dead center points" exist in the operation of the present mechanism whereat the driving forces are balanced or zero so as to require manual shifting of the parts out of such position, should they come to rest therein when the device is shut down, before the device can be restarted.

As will be observed from the foregoing description, a full 360° rotation of the follower 24 is not possible with the arrangement illustrated in Figs. 1–12, since when the recesses 101 and 102 in cams 92 and 93 are alined, the cam control assembly would merely oscillate up and down with the cam roller 94 moving from one of the recesses 101 or 102 to the other.

To accomplish full circle rotation of the follower 24, the arrangement of Figs. 1–12 may be modified in the manner illustrated in Figs. 13 and 14 wherein the lower control cam 93' has hinged thereto in alinement with its recess 102', as by a pair of lugs 200 and a pivot pin 201, a mask 202. Mask 202 is formed, below the pivot pin 201, with an offset portion 203 between which and the cam 93' is positioned a coil compression spring 203' for urging the upper end of the mask 202 toward the upper cam 92'. The upper end of the mask is formed with an arcuate, inwardly projecting detent 204, shouldered at 205, for receipt in a slot 206 in the upper cam 92' when the recess 101' therein is alined with the recess 102' in cam 93'. The mask is also formed with a second inwardly projecting detent 207 which when detent 204 is positioned in slot 206, is disposed in recess 101' in cam 92' and fills said recess to a plane substantially flush with the lower annular edge of the cam 92', as shown in Fig. 14. Thus, the cam roller 94 will be precluded from entering the recess 101' and, accordingly, follower 24 will be continuously driven in one direction of rotation once the mechanism is operating in such a manner that the cam roller is urged upwardly against the cam 92'. If, when the mechanism is started, the cam roller is urged downwardly against cam 93', the mechanism will continue to operate in the corresponding direction until it is reversed by the cam roller 94 entering recess 102' in cam 93'. After such reversal, the mechanism will continue to operate in the reverse direction until it is stopped or the mask 202 is retracted.

The arcuate configuration of the detent 204 permits the latter to be cammed to a retracted position out of the slot 206 by rotation of the cam 92', in the manner previously set forth. In such retracted position the detent 207 clears the recess 101' in cam 92' so as to permit movement of the cam roller 94 thereinto and reversing of the mechanism, as before described. The shoulder 205 on the detent 204 limits inward movement thereof to properly position the same.

A modified form of the present reversing mechanism, illustrated in Figs. 15–18, comprises a central shaft 300 which corresponds to the shaft 37 in Fig. 2 and is stationarily mounted within a water-tight casing, now shown, in the manner previously described with reference to the latter shaft. Journaled on the shaft 300 is a first inner sleeve 302 on which, in turn, is journaled a second outer sleeve 304.

As shown, the inner sleeve projects a distance above the outer sleeve and is formed at its upper end with a radial flange 306. Fixed in flange 306, and extending below the under face thereof, are a plurality of drive pins 308 which engage in openings 310 in a bevel gear 312 so that the gear is drivably coupled to the inner sleeve. Gear 312 has a central opening 314 receiving the inner sleeve, openings 310 and 314 being somewhat larger in diameter than the pins 308 and sleeve 302, respectively, so that the gear 312 is adapted for limited tilting movement, for reasons to be presently seen.

Outer sleeve 304 has a radial flange 316 rigid thereon adjacent its upper end, which flange rigidly mounts a plurality of upwardly projecting drive pins 318. These drive pins 318 are engaged in openings 320 in a second bevel gear 322 having a central opening 324 receiving the inner sleeve 302, as shown. As in the case of the gear 312, the openings 320 and 324 in the gear 322 are somewhat larger in diameter than the pins 318 and sleeve 302 so the latter gear is drivably connected to the sleeve 304 while being adapted for limited tilting movement. Gears 312 and 322 are retained in driving engagement on their respective drive pins 308 and 318 by a compression spring 328.

Sleeves 302 and 304 correspond, respectively, to sleeves 52 and 53 in Fig. 7 and are, together with the bevel gears 312 and 322, counter-rotatably driven from an impeller, not shown, through a pair of epicyclic gear trains, not shown, in the manner previously described with reference to said sleeves 52 and 53.

Journaled on the shaft 300, above the bevel gear 312, is a support or platform 330 rotatably carrying a pinion 332 which meshes with a pair of gears 334 and 336. Pinion 332 and gears 334 and 336 form an epicyclic gear train corresponding to the epicyclic gear train 49 in Fig. 7, and in the manner of the gears in this latter gear train, gear 334 is fixed on the shaft 300 and gear 336 is rotatable on the shaft. Also the number of teeth in said gears 334 and 336 differ by one so that upon rotation of platform 330 on the shaft 300 to planetate pinion 332 about fixed gear 334, gear 336 will be driven at a reduced speed. Driven gear 336 is rigid on the lower end of a sleeve 338 which is rotatable on shaft 300 and which is fixed at its upper end to a disk 340, corresponding to the disk 40 in Fig. 7. This disk 340 forms part of a final follower 342 which includes a nozzle, not shown, as in the previously described forms of the invention, through which nozzle a stream of water is adapted to be discharged.

Escapement means 344 and cam control means 346 are provided for alternately coupling the support 330 to the counter-rotating bevel gears 312 and 322 so as to cause oscillation of the platform 330, and therefore the final follower 342, between predetermined, adjustable limits.

Escapement means 344 comprises a depending arm 348 on the support 330 which is apertured adjacent its lower end for receiving a journal bolt 350 on which is journaled a bevel sector gear 352. As shown most clearly in Figs. 16–18, sector gear 352 has teeth 354 formed about approximately 180° of its periphery and has the remainder of its periphery cut away at 356. As illustrated in these latter figures, when the bevel gears 312 and 322 are driven in the counter directions of rotation shown, the sector gear 352 will, if its rotation is unrestricted, be rotated by the bevel gears 312 and 322, the sector gear meshing alternately with the latter gears. It will be apparent, therefore, that if the sector gear 352 is locked against rotation when engaged with one or the other of the bevel gears 312 or 322, the platform 330 will be carried around with the engaged bevel gear with resultant rotation of the final follower 342. It will be further apparent that if the sector gear 352 be momentarily released after rotation of the platform and final follower through a given arc, said sector gear will be rotated out of engagement with said engaged one of the bevel gears 312 or 322 and into engagement with the other bevel gear. If now the sector gear be again locked against rotation while engaged with said other bevel gear, the support 330 will be carried around with the latter bevel gear in the opposite direction of rotation. It will be seen, therefore, that the support 330, and, therefore, the final follower 342, may be caused to oscillate through a given arc by alternately locking the sector gear 352 against rotation and releasing said sector gear.

To accomplish this alternate locking and releasing of the sector gear 352, there is formed on the latter a radial cam 358 which cooperates with a pair of cam followers 360 and 362 carried on an arm 364 slidably bearing against the outer face of arm 348. This latter arm is slotted at 366 to receive the upper cam follower 360, and the arm 364 is, in turn, slotted at 368 to accommodate journal bolt 350 for the sector gear 352, as shown, so that the latter arm 364 is capable of limited vertical movement, as viewed in the drawings, relative to the arm 348.

From the description thus far, it will be seen that when the arm 364 is in the position illustrated in Figs. 15 and 16, lower cam follower 362 will be disposed in the path of the sector gear cam 358 so that upon rotation of the sector gear to the position shown in those figures, the cam 358 will engage the follower 362 and will exert a downward thrust on the latter. This thrust will tend to shift the arm 364 downwardly, as viewed in the drawings. If, however, the arm 364 be restrained against such downward movement, the sector gear 352 will be locked against rotation in engagement with lower bevel gear 322. Support 330 will, accordingly, be carried around by this latter gear, as just described.

When the arm 364 is released, it will be cammed downwardly by virtue of the above mentioned camming action of the cam 358 on the follower 362 so that sector gear 352 is permitted to rotate, as shown in Fig. 17, to bring its teeth 354 into mesh with those of the upper bevel gear 312 and cam 358 into engagement with the upper follower 360. Continued rotation of the sector gear 352 will cause upward camming of the arm 364, by virtue of the camming action of sector gear cam 358 on the upper follower 360, and disengagement of the sector gear and lower bevel gear, as shown in Fig. 18. If the arm 364 is now restrained against upward movement, with the parts positioned as shown in the latter figure, sector gear 352 will again be locked against rotation while engaged with upper bevel gear 312 so that the support 330 will be carried around in the opposite direction of rotation by the latter gear.

Cam control means 346 are provided for accomplishing this alternate restraining and releasing of the arm 364 to effect periodic reversal in the direction of rotation of the support 330 and, therefore, of the final follower 342.

Cam control means 346 comprises a lever 370 which is hinged at one end on the support 330, as by a hinge pin 372 carried in a pair (only one shown) of upstanding arms 374 on the support. The other end of the arm 370 is hinged at 376 to the upper end of the arm 364. An upstanding boss 378 is formed on the lever 370 intermediate its ends, the lever and boss having an opening 380 loosely receiving the sleeve 338 so that the lever 370 is accommodated to limited pivotal movement consistent with the aforementioned vertical movement of the arm 364.

Boss 378 is annularly grooved at 382 for receiving rollers 384 rotatably carried on the inner sides of the arms 386 (only one shown) defined by a forked end on a cam follower arm 388 which straddles the boss 378. This cam follower arm is identical to the arm 95 in Fig. 7.

Cam follower arm 388 is pivoted intermediate its ends between a pair of depending arms 390 (only one shown) rigid on the under side of final follower disk 340. The other end of cam follower arm 388 mounts a rotatable cam follower roller 392 which moves between a pair of circular cams 394 and 396 identical to the cams 92 and 93 in Fig. 7. These cams 394 and 396 are formed, respectively, with recesses 398 and 400 (Figs. 16 and 18) at one point about their periphery. The upper cam 394 may be angularly adjustable relative to the lower cam 396 in the same manner that cam 92, in Fig. 7, is adjustable relative to cam 93.

Operation of this latter modified form of the invention will be apparent from the foregoing description.

Upon driving of the bevel gears 312 and 322 in opposite directions of rotation from the impeller, not shown, or other drive means, the final follower 342 will be driven in one or the other direction of rotation depending on which bevel gear is currently engaged by the sector gear 352.

Assuming the sector gear to be engaged with lower bevel gear 322 and the cam follower roller 392 to be positioned between the straight portions of the cams 394 and 396, as shown in Fig. 16, the sector gear will be locked against rotation and the support 330 will be rotated in the direction of said lower bevel gear, and the final follower 342 will be driven in one direction. Upon cam follower roller reaching the recess 398 in the upper cam 394, the arm 364 will be released for downward movement under the action of the sector gear cam 358, as previously described, the cam follower roller moving upward into recess 398, and the sector gear will be freed to rotate through the position of Fig. 17 to the position of Fig. 18 with resultant upward camming of the arm 364, and downward movement of the cam follower roller 392 out of recess 398. Engagement of the roller 392 with the lower cam 396 will prevent further upward movement of the arm 364, and the sector gear 352 will be locked in engagement with the upper bevel gear 312, as shown in Fig. 18. The parts will now be rotated in the opposite direction, as shown, until the cam follower roller 392 becomes alined with recess 400 in the lower cam 396 whereupon the sector gear 352 will again be released for rotation into re-engagement with the lower bevel gear 322 and reversal in direction of rotation of the parts. It should be pointed out here that while the sector gear 352 has been illustrated as having 180° toothed and smooth segments, a greater number of segments of lesser angular extent may be employed so long as the number of each of the toothed and smooth segments is odd so as to place a smooth segment opposite each toothed segment.

Thus, it will be clear that the support 330 and the final follower 342 will oscillate through an arc determined by the spacing between the recesses 398 and 400 in the cams 394 and 396, and that by angular adjustment of the upper cam 394 to vary said spacing, the length of said arc of oscillation may be varied. If desired, this modified form of the invention may incorporate the previously described mask, shown in Figs. 13 and 14, so as to permit continuous unidirectional rotation of the final follower. The aforedescribed ability of the bevel gears 312 and 322 to tilt prevents jamming of the mechanism in the event of improper meshing of the sector gear with one or the other bevel gears.

Numerous modifications of the present reversing mechanism, incorporating the escapement principle of the invention, will occur to those skilled in the art. The present invention is, therefore, not to be thought of as limited to the particular arrangements chosen for illustrative purposes.

I claim:

1. In a rotation reversing mechanism, a pair of counter rotating driving members, a rotary driven member, rotary means on the driven member and including engagement means engageable with one driving member by rotation of the rotary means on the driven member to one position and engageable with the other driving member by rotation of the rotary means on the driven member to another position, and releasable stop means for locking said rotary means against rotation on the driven member when said rotary means are in either of said positions whereby said driven member will be caused to rotate in one direction when said rotary means are locked in said one position and to rotate in the opposite direction when said rotary means are locked in said other position.

2. In a rotation reversing mechanism, a pair of counter rotating driving members, a rotary driven member, rotary means on the driven member, means drivably connecting said driving members and rotary means for rotation of the latter on the driven member by the driving members, said connecting means including engagement means on the rotary means engageable alternately with one and then the other driving member during rotation of the rotary means on the driven member, and releasable stop means for locking said rotary means against rotation on the driven member when said engagement means are engaged with either driving member whereby said driven member will be caused to rotate in one direction when said rotary means are locked with said engagement means engaged with one driving member and to rotate in the opposite direction when said rotary means are locked with said engagement means engaged with the other driving member.

3. The subject matter of claim 2 including means for releasing said stop means at opposite ends of a desired arc of rotation of the driven member whereby said rotary means may be rotated by said driving members to rotate said engagement means out of engagement with one driving member and into engagement with the other driving member, and means for re-engaging said stop means upon said latter engagement whereby to cause reversal of the direction of rotation of the driven member.

4. The subject matter of claim 2 wherein said releasable stop means comprises projection means on said rotary means, and abutment means on the driven member releasably engageable with said projection means to restrain said rotary means against rotation.

5. The subject matter of claim 4 including cooperating means on said abutment means and projection means, and control means for mainting the abutment means and projection means in engagement through a predetermined arc of rotation of the driven member, said control means being operative to permit disengagement of the abutment means and projection means at opposite ends of said arc whereby said rotary means may be rotated by said driving members to rotate the engagement means out of engagement with one driving member and into engagement with the other driving member and re-engage said abutment means and projection means, and said control means being operative to maintain the latter engagement of the abutment means and projection means whereby to cause reversal in the direction of rotation of the driven member.

6. The subject matter of claim 5 wherein said control means are adjustable to vary the length of said arc.

7. The subject matter of claim 6 wherein said control means comprises a pair of relatively adjustable cams, and a cam follower operatively associated with said abutment means.

8. In a rotation reversing mechanism, a pair of coaxial counter rotating gears, a driven member mounted for rotation about the axis of said gears, first and second gear means journaled on said driven member and each including at least one toothed sector and a smooth sector, the first gear means being arranged to mesh with one counter rotating gear and the second gear means being arranged to mesh with the other counter rotating gear, means connecting said gear means for opposite simultaneous rotation thereof, the toothed sectors of the gear means being so relatively oriented as to mesh alternately with the counter rotating gears, and releasable stop means for locking said gear means against rotation on their own axes when either gear means is meshed with its respective counter rotating gear whereby said driven member may be driven in rotation by either counter rotating gear.

9. The subject matter of claim 8 and means for releasing said stop means at opposite ends of a desired arc of rotation of the driven member whereby said gear means will be rotated by said counter rotating gears to disengage one gear means from its counter rotating gear and engage the other gear means with its counter rotating gear, and means for re-engaging said stop means upon the engagement of said other gear means with its counter rotating gear whereby to reverse the direction of rotation of the driven member.

10. The subject matter of claim 9 wherein said first and second gear means are movably mounted on the driven member for movement toward and away from their respective counter rotating gears, and means for resiliently biasing said first and second gear means toward their respective counter rotating gears.

11. The subject matter of claim 10 wherein said stop means when engaged retain the first and second gear means against movement away from their respective counter rotating gears.

12. In a rotation reversing mechanism a pair of coaxial, counter rotating gears, a supporting member mounted for rotation about the axis of said gears, a pair of shafts journaled on said member in spaced parallel relation to said axis, meshing spur gears on said shafts connecting the latter for opposite simultaneous rotation, a first sector gear on one of said shafts and arranged to mesh with one of said counter rotating gears, a second sector gear on the other of said shafts and arranged to mesh with the other of said counter rotating gears, said sector gears each being cut away to form a plurality of circumferentially spaced toothed segments and being so oriented that one sector gear will be rotated into mesh with its counter rotating gear alternately with the meshing of the other sector gear with its counter rotating gear, and releasable stop means for preventing rotation of the sector gears on their own axes when either sector gear is meshed with its counter rotating gear whereby to cause said support member to rotate in one direction when the first sector gear is engaged and in the opposite direction when the second sector gear is engaged.

13. The subject matter of claim 12 wherein said releasable stop means comprises escapement means including projection means on said spur gears, pallet means carried by said supporting member and releasably engageable with said projection means, and control means for normally retaining the pallet means in engagement with the projection means.

14. The subject matter of claim 13 wherein said projection means comprises at least one escapement tooth on each spur gear, a pallet finger on the pallet means engageable with each tooth, said pallet means being pivoted to the support member for movement between a central position wherein both of said fingers are in the paths of their respective escapement teeth and positions wherein only one or the other of said fingers is in the path of its escapement tooth, and camming surfaces on the escapement teeth for camming said fingers out of engagement therewith.

15. The subject matter of claim 14 wherein said control means comprises a pair of stationary, axially spaced, cylindrical cams, and a cam follower carried by said support member and movable between said cams, said follower being operatively connected to said pallet means for movement into contact with one or the other of said cams by the camming action between the pallet fingers and escapement teeth, said cams each having their camming surface relieved at one point to accommodate movement of the cam follower and pallet to disengage one pallet finger from its escapement tooth whereby said sector gears will be rotated by the counter rotating gear to disengage one sector gear from its counter rotating gear and engage the other sector gear with its counter rotating gear, the other pallet finger thereby becoming engaged with the other escapement tooth to reverse the direction of rotation of the support member.

16. The subject matter of claim 15 wherein said cams are relatively adjustable to vary the distance between said relieved portions thereof.

17. The subject matter of claim 16 including means for removably blocking one of said relieved portions when the relieved portions in the cams are alined.

18. The subject matter of claim 17 wherein the last mentioned means comprises a mask pivoted on one of said cams in alinement with the relieved portion thereof, said mask having a detent movable into the relieved portion of the other cam to block the same, means biasing said detent toward said other cam, and means for retaining the mask in a retracted position until the relieved portions in the cams are alined.

19. In a rotation reversing mechanism, a pair of coaxial, counter rotating gears, a driven member mounted for rotation about the axis of said gears, gear means journaled on the driven member and including at least one toothed sector and a smooth sector, said gear means being arranged to have its toothed sector mesh with said counter rotating gears alternately whereby said gear means is adapted to be rotated in one direction by said counter rotating gears, and releasable stop means for locking said gear means against rotation about its axis when its toothed sector is meshed with either of said counter rotating gears whereby said driven member may be driven in rotation by either counter rotating gear.

20. The subject matter of claim 19 wherein said counter rotating gears comprise bevel gears and said gear means comprises a bevel gear, said axis of the latter gear extending normal to the axis of and midway between said counter rotating bevel gears.

21. The subject matter of claim 20 wherein said counter rotating bevel gears are mounted for limited tilting movement relative to their axis, and means for resiliently retaining said latter gears in normal position normal to their axis.

22. The subject matter of claim 19 wherein said releasable stop means comprises a cam on said gear means, cam follower means, means movably mounting said cam follower means on said driven member for releasable engagement of the cam follower means with said cam when the gear means is meshed with either of said counter rotating gears to restrain said gear means against rotation, said cam being shaped to move said follower means out of engagement therewith, and control means for releasably restraining movement of said cam follower mounting means to maintain said cam follower means in engagement with said cam through a predetermined arc of rotation of the driven member, said control means being operative to release said mounting means at opposite ends of said arc and thereby permit movement of said cam follower means out of engagement with said cam whereby said gear means will be released for rotation by said counter rotating gears out of mesh with one of the latter gears and into mesh with the other to re-engage said cam and cam follower means, and said control means being operative to maintain the latter engagement of the cam and cam follower means whereby to cause reversal in the direction of rotation of the driven member.

23. The subject matter of claim 22 wherein said control means comprises cam follower means and a pair of cams operatively associated with said latter cam follower means, said pair of cams being relatively adjustable to vary the length of said arc.

24. In a rotation reversing mechanism, a support, a rotary driving member and a rotary driven member rotatable mounted on said support, reversible drive mechanism connecting said members for driving of the driven member in opposite directions of rotation from the driving member, said drive mechanism including cooperating cam means and cam follower means for controlling said drive mechanism to reverse the direction of rotation of the driven member, one of said means being mounted on said support and the other means being operatively connected to said driven member for movement proportional to movement of the driven member, said drive mechanism being reversed in response to alignment of said cam follower means with predetermined portions of said cam means, and one of said means being adjustable to effect adjustment of the angular position of the driven member relative to said support when said cam follower means is aligned with said portions of the cam means.

25. The subject matter of claim 24 wherein said cam means comprises at least one cylindric cam carried on said support and said cam follower means is connected to said driven member for rotation with the latter along said cylindric cam, said cam follower means having a normal position wherein said drive mechanism is conditioned for continued driving of said driven member in a given direction of rotation, said drive mechanism including means whereby said cam follower means is urged in a direction transverse to its direction of rotational movement to a predetermined position in response to rotation of the driven member in said given direction, and said drive mechanism being operative to effect reversal of the direction of rotation of the driven member in response to movement of the cam follower means to said predetermined position, said cylindric cam having a cam surface engaged by said cam follower means and relieved at one position to accommodate movement of the cam follower means to said predetermined position, the cam follower means being retained in said normal position by the remainder of said cam surface.

26. The subject matter of claim 25 including means for selectively blocking the relief in said cam to cause continuous unidirectional rotation of said driven member.

27. In a rotation reversing mechanism, a support, a rotary driving member and a rotary driven member rotatably mounted on said support, reversible drive mechanism connecting said members for driving of the driven member in opposite directions of rotation from the driving member, said drive mechanism including cooperating cams and a cam follower for controlling said drive mechanism to reverse the direction of rotation of the driven member, said cams comprising a pair of concentric, axially spaced cylindric cams carried on said support and having annular cam surfaces on their opposing ends, said cam follower engaging between said cams and being connected to said driven member for rotation with the latter along said cam surfaces, said cam follower having a normal position wherein said drive mechanism is retained in condition to cause unidirectional rotation of the driven member, said cam follower being urged in a first direction transverse to its direction of rotation in response to rotation of the driven member in one direction and in a second, opposite transverse direction from said normal position in response to rotation of the driven member in the opposite direction, said drive mechanism being operative to reverse the direction of rotation of the driven member in response to movement of said cam follower to preset positions in said first and second directions, said cam surfaces each having a relief to accommodate movement of said cam follower to one of said preset positions whereby to effect reversal of the driven member, and the remainder of said cam surfaces being shaped to retain said cam follower in said normal position whereby to effect unidirectional rotation of the driven member, the arrangement being such that said driven member oscillates through an angle equal to the angular displacement between said reliefs in the cams.

28. The subject matter of claim 27 including means for relatively, angularly adjusting said cams to adjust the relative angular position of said reliefs in the cams whereby to enable adjustment of the arc of oscillation of the driven member.

References Cited in the file of this patent

UNITED STATES PATENTS 1,518,879     Spencer ---------------- Dec. 9, 1924